Sept. 24, 1968  C. W. MacMILLAN  3,402,905
ATTACHING MEANS FOR WHEEL GAUGES AND THE LIKE
Filed Sept. 1, 1966  2 Sheets-Sheet 2
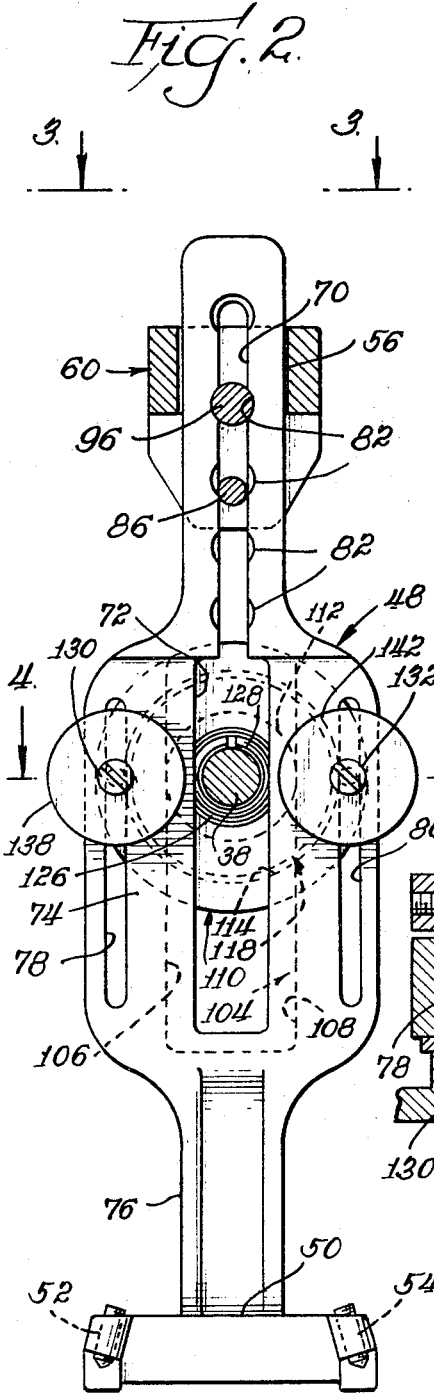
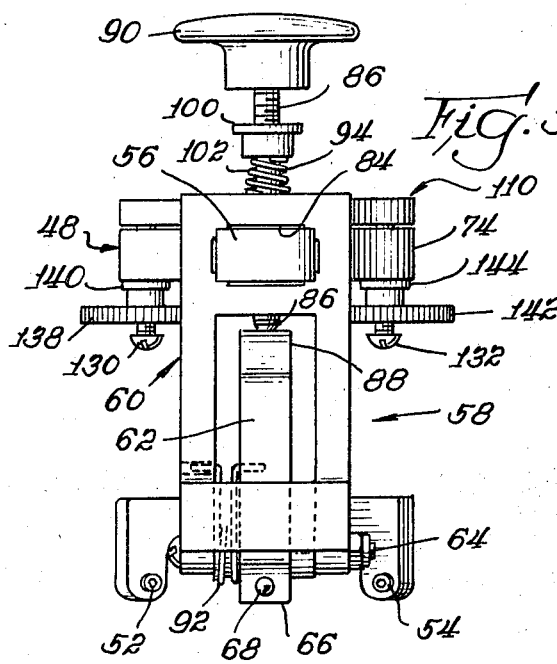
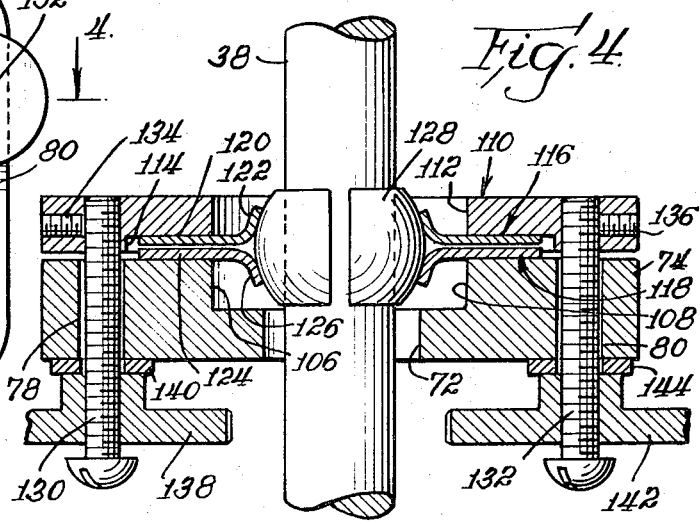
Inventor
Charles W. MacMillan
By Gary, Parker,
Juettner & Cullinan Attys.

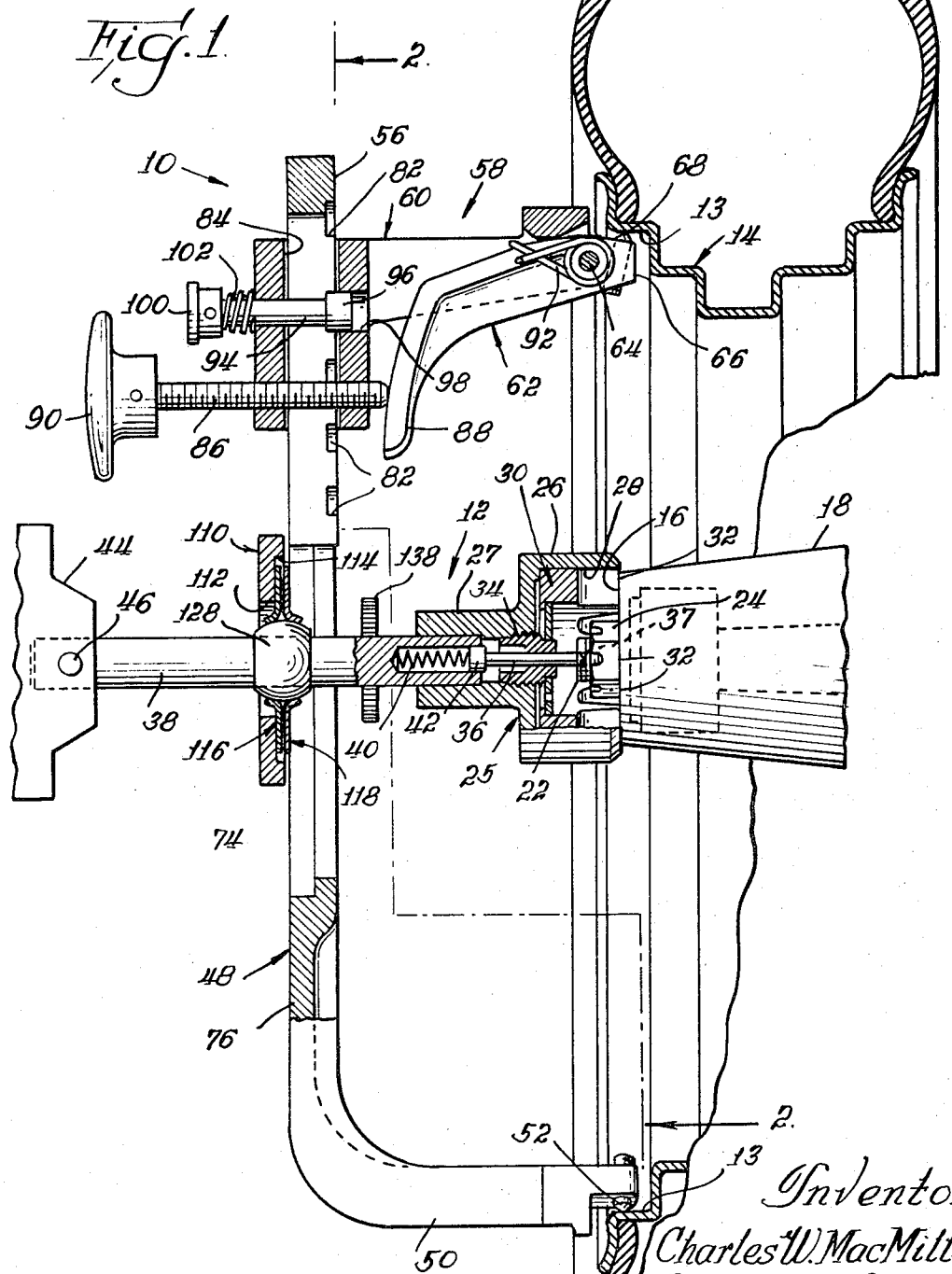

United States Patent Office 3,402,905
Patented Sept. 24, 1968

3,402,905
ATTACHING MEANS FOR WHEEL GAUGES
AND THE LIKE
Charles W. MacMillan, Rock Island, Ill., assignor to Bear Manufacturing Company, Rock Island, Ill., a corporation of Delaware
Filed Sept. 1, 1966, Ser. No. 576,752
14 Claims. (Cl. 248—205)

ABSTRACT OF THE DISCLOSURE

Apparatus for attaching a wheel alinement gauge or the like to the wheel of an automotive vehicle including an adapter which abuts against a machined end face of the wheel hub and has a shaft or spindle for mounting an alinement gauge, and a rim clamp which attaches rigidly at the rim of the vehicle wheel and includes adjustable supporting means for rigidly supporting the spindle of the adapter while permitting the spindle to assume a position perpendicular to the machined hub end face independently of the position of the rim clamp.

---

The present invention relates to improved means for attaching wheel alinement gauges or the like to the wheels of automotive vehicles. More specifically, the invention relates to a wheel clamp assembly comprising a combination of a rim clamp which attaches at the rim of a vehicle wheel, and an adapter which abuts against the machined end face of the wheel hub. In accordance with the invention, the adapter includes a shaft or spindle for mounting a wheel alinement gauge, and the adapter spindle cooperates with the rim clamp so as to be rigidly supported thereby while being located by the hub end face independently of the orientation of the rim clamp.

It is known in the art to utilize a rim clamp in order to mount a wheel alinement gauge for measuring the angle of the wheel spindle such as camber, caster, toe and steering axis inclination. Such a rim clamp is attached firmly to the wheel rim, and it normally includes a rigidly attached shaft or spindle which is approximately perpendicular to the plane of the wheel and serves to mount a wheel alinement gauge. However, a serious objection to the use of a conventional rim clamp is the resultant problem of having to eliminate "wheel run out" before taking any readings with the alinement gauge.

The term "wheel run out" refers to a phenomenon which is noticeable as an apparent side-to-side "wobble" in the wheel as it rotates. It is caused by distortions in or damage to the wheel which results in non-uniform disposition of comparable points on the wheel about the axis of the spindle. Because of the foregoing rather common phenomenon, it is not possible to attach a rim clamp to the rim of a wheel with assurance that the rim clamp spindel is a true extension of the wheel spindle or that it is parallel to the wheel spindle axis. Consequently, the usual procedure is to mount the rim clamp on the rim of the wheel, mount a wheel alinement gauge on the rim clamp spindle, jack up the vehicle so that the front wheels are free to rotate, and then slowly rotate the wheel while taking camber readings from the alinement gauge so as to check for wheel run out. The positions of the wheel at the maximum and minimum camber readings are noted, the wheel is then rotated half way between such extreme positions, and a mark is placed on top of the wheel. Thereafter, the vehicle is lowered to the ground and alinement readings are made, at which time the foregoing mark must be disposed at the top for checking caster, camber and steering axis inclination, and at 90 degrees to the rear or front for checking toe-in.

Not only is the foregoing procedure unduly time consuming and burdensome for an operator, but in addition it involves a further serious disadvantage, since once the vehicle is jacked up and then lowered, it does not tend to settle back to its normal position, thereby very possibly introducing errors into the various readings.

It is further known in the art to utilize a magnetic adapter which mounts directly on the machined end face of the wheel hub and thereby eliminates the problem of checking for wheel run out. Such an adapter is magnetically held to the end face of the wheel hub, and it includes a rigid shaft or spindle which serves to mount an alinement gauge and which is a true extension of the wheel spindle. However, magnetic adapters are subject to the serious disadvantage that they frequently fall off of the wheel hub under the weight of the alinement gauge or other equipment mounted thereon. In other words, it has not been possible with such devices to develop a sufficient magnetic holding force so as to assure that the adapter will remain attached to the wheel hub under all normal working conditions, and this problem has become particularly acute in recent years due to the fact that many current hub designs, particularly on smaller cars, are such that very little area is provided at the end of the hub, thereby reducing the magnitude of the magnetic holding force which can be developed.

It is therefore a general object of the present invention to provide improved means for attaching a wheel alinement gauge to a vehicle wheel so as to eliminate the foregoing disadvantages of the devices heretofore known.

A more specific object of the invention is to provide a wheel clamp assembly including an adapter member which abuts against the machined end face of the wheel hub and includes a rigid gauge-mounting spindle which constitutes an axial extension of the wheel spindle, and including in combination therewith a rim clamp which is not provided with its own spindle but which firmly attaches at the rim of the wheel and serves to support the adapter spindle.

Other objects and advantages of the invention will become apparent from the following detailed description of the invention.

Now, in order to acquaint those skilled in the art with the manner of making and using the improved wheel clamp assembly of the present invention, I shall describe, in conjunction with the accompanying drawings, a preferred embodiment of the invention and a preferred manner of making and using the same.

In the drawings:

FIGURE 1 is a longitudinal sectional view, partly in elevation and partly broken away, showing a wheel clamp assembly constructed in accordance with the present invention, the assembly including a rim clamp member shown attached at the rim of a vehicle wheel, and an adapter member shown abutted against the end face of the wheel hub and having a rigid shaft or spindle on which alinement gauge is mounted;

FIGURE 2 is a sectional view taken substantially along the line 2—2 of FIGURE 1;

FIGURE 3 is an end elevational view looking approximately in the direction of the arrows 3—3 of FIGURE 2; and FIGURE 4 is an enlarged transverse sectional view, partly broken away, taken substantially along the line 4—4 of FIGURE 2 and showing the manner in which the rim clamp member cooperates with the adapter spindle to support the latter.

Referring now to the drawings, FIGURE 1 shows a rim clamp assembly 10 in combination with an adapter assembly 12, the rim clamp assembly being attached to a wide portion 13 of a wheel rim 14, and the adapter assembly being held in abutment against a machined end face 16 of a wheel hub 18. There are also shown a tire 20 mounted on the rim 14, a wheel spindle 22 projecting axially from the center of the hub 18, and a nut 24 threaded on the spindle 22 so as to bear against the hub end face 16.

The adapter assembly 12 includes a housing indicated generally at 25 comprising a large diameter cylindrical housing portion 26 and a smaller diameter housing portion 27. The housing portion 26 has a large cylindrical recess 28 in which a magnet 30 is fixedly mounted. The magnet 30 comprises an annular permanent magnet which is notched at its outer face to provide a plurality of circumferentially spaced pole pieces each having a flat outer face 32. The outer faces 32 of the magnet pole pieces are coplanar and define a flat surface which engages against the flat machined end face 16 of the wheel hub 18.

A guide member 34 is threaded into the housing 25 and has a central bore in which a plunger pin 36 is axially slidable. The plunger pin 36 is concentrically located relative to the housing 25 and has a conical pointed end which projects into a small central recess 37 of a type conventionally formed in the end of the wheel spindle 22. A shaft or spindle 38 is press fitted into the end of the housing portion 27, and the end of the adapter spindle 38 houses a compression spring 40 which acts on the plunger 36 to urge the same against the wheel spindle 22, the axial movement of the plunger being limited by an enlarged collar 42 thereon.

It will be understood from the foregoing that by positioning the adapter assembly 12 so that the conical end of the plunger pin 36 projects into the small central recess 37 formed in the end of the wheel spindle 22, thereby assuring that the adapter is located concentrically relative to the wheel spindle, and with the magnet 30 surrounding the end of the spindle 22 with the magnet pole piece faces 32 engaged against the machined hub end face 16, the adapter assembly 12 will be magnetically attached to the wheel hub so as to project axially outwardly therefrom. Moreover, by mounting the adapter 12 against the accurately machined hub end face 16 and concentrically relative to the wheel spindle 22, the adapter will be located in a precise manner and the adapter spindle 38 will be located so as to be perpendicular to the plane of the vehicle wheel and constitute a true axial extension of the wheel spindle 22. Thus, a wheel alinement gauge or other measuring apparatus such as shown by way of example at 44 may be mounted on the end of the adapter spindle 38 and may be used to measure the angle of the wheel spindle 22 such as camber, caster, toe and steering axis inclination, without any necessity for jacking up the vehicle wheels and checking for wheel run out. As shown in FIGURE 1, the gauge 44 is simply mounted on the end of the shaft 38 and releasably held thereon by a thumb screw 46.

The rim clamp assembly 10 includes a body member indicated generally at 48 having a transverse integral arm 50 at one end which carries a pair of adjustable cone point set screws 52 and 54. When the rim clamp assembly is in operative position relative to the wheel rim 14 as shown in FIGURE 1, the set screws 52 and 54 engage against the wide rim portion 13 so as to grip the same and hold the rim clamp in position. The opposite end of the body 48 comprises a relatively narrow straight body portion 56 (see FIGURES 1, 2 and 3) on which a leg assembly 58 is adjustably mounted. The leg assembly 58 includes a leg 60 having a bellcrank lever 62 pivotally mounted thereon by means of a pivot pin or the like 64. The lever 62 has a short extension 66 which carries a cone point set screw 68 for engagement with the wide portion 13 of the wheel rim 14 approximately diametrically opposite the previously described set screws 52 and 54, as will be explained more fully hereinbelow.

The narrow body portion 56 of the rim clamp body 48 is generally rectangular in cross section and is provided with a longitudinal slot 70 (see FIGURE 2). The slot 70 begins near one end of the body portion 56 and extends therealong until it communicates with a wider slot portion 72 which extends along the major portion of the length of a relatively wide intermediate body portion 74, there being also provided a further narrow body portion 76 which is bent at the end thereof to form the previously described transverse arm 50. In the wide portion 74 of the rim clamp body 48 there are also formed a pair of slots 78 and 80 which are on opposite sides of the slot 72 and are parallel thereto. It will further be noted that a plurality of counterbores 82 (see FIGURES 1 and 2) are provided in longitudinally spaced relation along the length of the slot 70 at the inner or right hand side of the body section 56 as viewed in FIGURE 1, the counterbores being provided for a purpose to be described hereinafter. The leg 60 has a generally rectangular opening 84 extending therethrough (see FIGURE 3) which permits the leg to be slidably mounted over the body portion 56 of the wheel clamp body 48. An adjusting screw 86 is threaded through the leg 60 and extends through the slot 70 so that the end of the screw engages against an end portion 88 of the bellcrank lever 62, and the opposite end of the screw carries a manually operable knob 90. The bellcrank lever 62 is biased in a clockwise direction as viewed in FIGURE 1 by a torsion spring 92, and the lever may be pivoted in a counterclockwise direction about the pivot pin 64 by manually rotating the knob 90 so as to advance the screw 86 against the lever arm 88.

There is also provided a lock pin 94 which is carried by the leg 60 and passes through the slot 70 therein so as to be parallel to the screw 86. The lock pin 94 is somewhat smaller in diameter than the width of the slot 70 so as to be freely movable longitudinally therein, and on the end of the pin 94 there is an enlarged cylindrical head 96 which is slidable within a bore 98 in the leg 60. The opposite end of the pin 94 is provided with a push button 100, and a compression spring 102 is positioned on the pin between the button 100 and the adjacent face of the leg 60 so as to bias the pin 94 outwardly or to the left as shown in FIGURE 1 to a locked position. In other words, when the button 100 is pushed so as to move the pin 94 to the right as viewed in FIGURE 1 against the force of the spring 102, the enlarged head 96 will be disposed in the bore 98 so as to be completely out of the slot 70, and the leg 60 will be free to move longitudinally along the length of the body section 56. The enlarged head portion 96 of the pin 94 is larger in diameter than the width of the slot 70 but will fit within any selected one of the several counterbores 82. The particular rim clamp described herein will fit 13 inch to 17½ inch wheels, but of course it can be built to handle any special size.

It will be understood from the foregoing that when mounting the rim clamp assembly 10 to a wheel rim such as the rim 14, the size of the rim clamp may be adjusted to suit the size of the rim by depressing the button 100, sliding the leg assembly 58 in either direction along the length of the body section 56, and permitting the enlarged pin head 96 to snap into locked position in a selected one of the several counterbores 82. Thereafter, the rim clamp assembly 10 is positioned so as to locate the two set screws 52 and 54 in engagement with the rim portion 13 as shown in FIGURE 1, with the set screw 68 adjacent a diametrically opposite portion of the rim. The knob 90 is then rotated so as to advance the screw 86 against the lever arm 88 and thereby pivot the bellcrank lever 62 until the set screw 68 is firmly engaged against the rim portion 13. In this manner, the rim clamp assembly 10 is firmly clamped to the vehicle wheel rim 14 so that it may carry a substantial load without becoming accidentially detached from the rim.

The manner in which the adapter spindle 38 cooperates with the rim clamp assembly 10 so as to be supported thereby will now be described. It will be seen from FIGURE 4 that the slot portion 72 in the intermediate body section 74 extends only partially through the thickness of the body and then communicates with a substantially wider slot or longitudinal recess 104 defined by side walls 106 and 108. A lock plate 110 is disposed parallel to the rim clamp body section 74 so as to be movable along the length of the relatively wide longitudinal recess 104. The lock plate 110 comprises a cylindrical disc having a central bore 112, and on the inner side facing the body portion 74 the lock plate is provided with a large diameter counterbore 114. A pair of lock discs 116 and 118 are positioned between the rim clamp body portion 74 and the lock plate 110 so as to be disposed in the counterbore 114, although the thickness of the two lock discs somewhat exceeds the depth of the counterbore so as to permit clamping of the lock discs between the lock plate 110 and the body portion 74 as will be described more fully hereinafter. It will also be noted that the diameter of the counterbore 114 exceeds the diameter of each of the lock discs 116 and 118 so as to permit limited radial movement of the latter relative to the lock plate 110 and the body portion 74.

The lock disc 116 comprises a generally flat annular plate portion 120 which is bent at its radially inner edge to provide an inclined annular retaining rim 122. In a similar manner, the lock disc 118 comprises a generally flat annular plate portion 124 and an inclined annular retaining rim 126. The two lock discs 116 and 118 are disposed in approximate face-to-face relation with the retaining rims 122 and 126 extending away from one another, and a split bushing 128, in the form of a spherical segment preferably made of nylon or plastic, is located inside of the two retaining rims so as to be encompassed and held thereby. It will further be seen that when the rim clamp assembly 10 and the adapter assembly 12 are operatively associated with one another the adapter shaft 38 extends through the split bushing 128 and is capable of being gripped and supported thereby.

A pair of screws 130 and 132 extend through the longitudinal slots 78 and 80 in the rim clamp body portion 74 and are threaded into the lock plate 110, the screws being held against rotation by a corresponding pair of set screws 134 and 136 carried by the lock plate. A hand knob or nut 138 is threaded on the screw 130, and a washer 140 is positioned between the hand knob and the surface of the body portion 74. In a similar manner, a hand knob or nut 142 is threaded on the screw 132, and a washer 144 is positioned between the latter hand knob and the body portion 74. Since the screws 130 and 132 are held against rotation, it is thus possible by manual rotation of the nuts 138 and 142 to tightly clamp the lock plate 110 in a selected position relative to the wheel clamp body portion 74. Moreover, when the lock plate 110 is clamped against the body portion 74 it compresses the lock discs 116 and 118 together thereby closing the split bushing 128 on the adapter spindle 38 so as to rigidly grip and support the latter.

In operation, with the hand nuts 138 and 142 in loose condition, the adapter assembly 12 is associated with the rim clamp assembly 10 by passing the adapter spindle 38 through the split bushing 128. Initially, the adapter assembly 12 is positioned in a retracted position relative to the rim clamp assembly 10, i.e., more to the left as viewed in FIGURE 1 relative to the rim clamp assembly, since the rim clamp assembly is the first to be mounted to the vehicle wheel. If any adjustment of the effective length of the rim clamp assembly 10 is required in order to fit the particular vehicle wheel, then the button 100 is depressed and the leg assembly 58 is moved longitudinally over the body portion 56 in a desired direction in order to lengthen or shorten the effective length of the rim clamp assembly as required. When the leg assembly 58 is in a desired position with the locking pin 94 in alinement with one of the counterbores 82, the push button 100 is released and the locking pin 94 is permitted to be moved by the spring 102 so as to dispose the enlarged pin head 96 in the selected counterbore 82 thereby locking the leg assembly in position.

After removing the dust cap and grease cap so as to expose the end of the wheel spindle 22, the rim clamp assembly 10 is positioned so as to locate the two set screws 52 and 54 against the wide portion 13 of the wheel rim 14 at one area thereof, with the set screw 68 on the lever arm 66 adjacent the rim portion 13 at a diametrically opposite area thereof. The knob 90 is rotated so as to advance the screw 86 against the lever arm 88 and thereby pivot the lever 62 in a counterclockwise direction as viewed in FIGURE 1, thus causing the set screw 68 to firmly engage the wheel rim 13. In this manner, the rim clamp assembly 10 is firmly attached to the wheel rim portion 13 so as to be able to carry a substantial load without accidental detachment from the rim.

The adapter assembly 12 is next positioned relative to the clamp body 48 so that the adapter can be located against the end face 16 of the wheel hub 18. It will be seen that with the hand nuts 138 and 142 in loose condition, the entire adapter assembly together with the assembly of the lock plate 110, lock discs 116 and 118, split bushing 128, screws 130 and 132 and hand nuts 138 and 142 can be shifted longitudinally relative to the fixed clamp body 48. During such longitudinal adjustment the adapter spindle 38 moves along the slot 72 in the body 48, while the screws 130 and 132 move along the slots 78 and 80. In addition to the longitudinal adjustment described above, it will be noted that the adapter spindle 38 together with the bushing 128 and lock discs 116 and 118 can be shifted a limited amount in any radial direction relative to the lock plate 110 due to the fact that the diameter of the counterbore 114 in the lock plate is greater than the outer diameter of the lock discs thereby permitting radial shifting movement of the latter. Moreover, the split bushing 128 is capable of universal movement within the retaining rims 122 and 126 so as to adjust to the angular orientation of the adapter spindle 38. Accordingly, the bushing 128 in which the adapter spindle 38 is mounted, and the various other components which are movable with the bushing relative to the clamp body 48, will accommodate movement of the adapter spindle to whatever position is necessary in order to locate the adapter in a concentric position against the hub end face 16.

The adapter assembly 12 is thus positioned with the spring-loaded plunger pin 36 projecting into the recess 37 formed centrally in the end of the wheel spindle 22, and with the magnet surface defined by the flat faces 32 of the magnet pole pieces engaged against the machined hub end surface 16. In this manner, the adapter assembly 12 is magnetically attached to the end of the wheel hub 18 and is positioned so that the adapter spindle 38 constitutes a true axial extension of the wheel spindle 22. Thereafter, the hand nuts 138 and 142 are tightened so as to clamp the lock plate 110 against the body portion 74 of the rim clamp body 48. The lock plate 110 thereby compresses the two lock discs 116 and 118 together so as to fix the latter in position, and the compressing of the two lock discs causes the split bushing 128 to close on the adapter spindle 38 so as to firmly grip and support the adapter spindle without in any way affecting the orientation of the latter as a true extension of the wheel spindle 22. Any gauge device for measuring camber, caster and toe may then be attached to the adapter spindle 38 to obtain accurate camber, caster and toe readings. Thus, the wheel alinement gauge 44, which may for example be of the type disclosed in my U.S. Patent 3,071,863, may then be mounted on the end of the spindle 38 and removably secured thereto by the thumbscrew 46, and if desired the gauge may have toe measuring means associated therewith as shown in my U.S. Patent 3,135,052.

It will be understood that in accordance with the present invention the position of the adapter spindle 38 is controlled by the machined hub end face 16 together with the conventional concentric recess 37 in the end of the wheel spindle 22, and in this manner the adapter spindle is located so as to define a true 90 degree angle with the hub end face 16 and thus constitute a true axial extension of the wheel spindle 22 completely independently of the rim clamp assembly 10 and regardless of the position of the latter. On the other hand, the rim clamp assembly 10 is capable of being secured to the rim portion 13 in a very firm manner so as to be capable of carrying a much greater load than the magnetically attached adapter spindle 38, and thus by utilizing the rim clamp assembly to support the adapter spindle 38 without affecting the orientation thereof, it is possible to obtain the full benefits of the strength of the rim clamp while at the same time achieve the benefits of locating the spindle 38 from the machined hub end face 16 so as to eliminate completely the necessity of checking for wheel run out.

It is also important to note that in accordance with the present invention it is not necessary that the magnet 30 be utilized to attach the adapter assembly 12 to the hub end face 16. In other words, once the adapter assembly is located against the hub end face and the nuts 138 and 142 are tightened, the adapter assembly is firmly held in position against the face 16 by the gripping action of the bushing 128 on the adapter spindle 38, and the magnetic attaching force provided by the magnet 30 is not needed. It may of course still be found desirable to utilize the magnet 30 since it facilitates the holding of the adapter assembly 12 in position against the hub end face during the time that the hand nuts 138 and 142 are being tightened. Nevertheless, it is within the scope of the present invention that the magnet may be eliminated and a member substituted therefor which has a flat bearing surface or any other suitable abutment means for abutting against the machined hub end face and locating the spindle 38 so as to be perpendicular to such end face.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. A wheel clamp assembly for attaching a wheel alinement gauge or the like to a vehicle wheel of the type including a wheel rim, a wheel spindle, and a hub having a machined hub end face, the improvement comprising, in combination, a rim clamp assembly having gripping means for engaging said wheel rim at a plurality of spaced points thereon so as to permit firm attachment of said rim clamp assembly to said wheel rim, an adapter assembly including an adapter spindle for carrying a wheel alinement gauge on one end thereof and abutment means rigidly associated with the other end thereof and engageable with said hub end face for positioning said adapter spindle perpendicular to said hub end face, and spindle support means carried by said rim clamp assembly for releasably supporting said adapter spindle intermediate the ends thereof, said spindle support means being adjustable relative to said rim clamp assembly in accordance with the position of said adapter spindle so as to support the latter in a rigid manner perpendicular to said hub end face independently of the position of said rim clamp assembly.

2. The invention of claim 1 where said abutment means has a flat bearing surface for engagement with said hub end face, said flat bearing surface being perpendicular to said adapter spindle.

3. The invention of claim 1 where said abutment means comprises a magnet for magnetically attaching said adapter assembly to said hub end face.

4. The invention of claim 1 where said wheel spindle is of a type having a central recess formed in the end face thereof, and where said adapter assembly includes plunger means for engaging in said recess and thereby locating said adapter assembly concentrically relative to said wheel spindle.

5. The invention of claim 1 where said rim clamp assembly includes a body member and said spindle support means is carried by said body member and is adjustably positionable along the length thereof, and means for releasably locking said spindle support means in a selected position along the length of said body member in accordance with the position of said adapter spindle.

6. The invention of claim 1 where said spindle support means includes a split spherical bushing which at least substantially surrounds said adapter spindle, and means for releasably clamping said bushing on said adapter spindle to rigidly support the same.

7. The invention of claim 1 where said rim clamp assembly includes a body member and said spindle support means is carried by said body member and is adjustably positionable along the length of said body member, said spindle support means also being adjustable transversely to the length of said body member and being movable as a universal joint in order that said spindle support means may be located to accommodate the position of said adapter spindle when the latter is disposed perpendicular to said hub end face and concentric to said wheel spindle, and means for releasably locking said spindle support means in a selected position relative to said body member in accordance with the position of said adapter spindle.

8. A wheel clamp assembly for attaching a wheel alinement gauge or the like to a vehicle wheel of the type including a wheel rim, a wheel spindle, and a hub having a machined hub end face, the improvement comprising, in combination, a rim clamp assembly having gripping means for engaging said wheel rim at a plurality of spaced points thereon so as to permit firm attachment of said rim clamp assembly to said wheel rim, an adapter assembly including an adapter spindle for carrying a wheel alinement gauge on one end thereof and abutment means rigidly associated with the other end thereof and engageable with said hub end face for positioning said adapter spindle perpendicular to said hub end face, said rim clamp assembly including a body member, spindle support means adjustably carried by said body member for releasably supporting said adapter spindle intermediate the ends thereof, said spindle support means including clamp bushing means which at least substantially surrounds said adapter spindle for releasably clamping the same, bushing carrier means adjustably movable on said rim clamp body member, and means for releasably locking said bushing carrier means in a selected position on said body member in accordance with the position of said adapter spindle.

9. The invention of claim 8 where said bushing carrier means is adjustably movable along the length of said body member and is also adjustable transversely to the length of said body member.

10. The invention of claim 8 where said clamp bushing is spherical and is angularly adjustable relative to said bushing carrier means in the manner of a universal joint so as to permit said clamp bushing to be oriented in accordance with the orientation of said adapter spindle.

11. The invention of claim 8 where said bushing carrier means is adjustably movable along the length of said body member and is also adjustable transversely to the length of said body member, and where said clamp bushing is spherical and is angularly adjustable relative to said bushing carrier means in the manner of a universal joint.

12. The invention of claim 11 where said bushing carrier means comprises a pair of locking members each having a substantially flat portion and a radially inner inclined annular retaining rim, said locking members being disposed in substantial face-to-face relation with said retaining rims extending away from one another, said spherical clamp bushing being carried within said pair of retaining rims so that compression of said two locking members toward one another will cause said inclined annular retaining rims to close said spherical clamp bushing on said adapter spindle, lock plate means disposed in substantial face-to-face relation with the flat portion of the outer one of said locking members, and manually operable means for forcing said lock plate means toward said body member so as to clamp said pair of locking members therebetween thereby clamping said locking members in a selected position and causing the latter to close said clamp bushing on said adapter spindle.

13. A wheel clamp assembly for attaching a wheel alinement gauge or the like to a vehicle wheel of the type including a wheel rim, a wheel spindle, and a hub having a machined hub end face, the improvement comprising, in combination, a rim clamp assembly having gripping means for engaging said wheel rim at a plurality of spaced points thereon so as to permit firm attachment of said rim clamp assembly to said wheel rim, an adapter assembly including an adapter spindle for carrying a wheel alinement gauge on one end thereof and a magnet having a flat bearing face rigidly associated with the other end thereof, said magnet bearing face being engageable with said hub end face for positioning said adapter spindle perpendicular to said hub end face and magnetically attaching the adapter spindle to said hub end face, said rim clamp assembly including a body member, spindle support means adjustably carried on said body member for releasably supporting said adapter spindle intermediate the ends thereof, said spindle support means being adjustably positionable along the length of said body member and also being adjustable transversely to the length of said body member, and said spindle support means further being movable as a universal joint relative to said body member so that said spindle support means may be located to accommodate the position of said adapter spindle, and means for releasably locking said spindle support means in a selected position relative to said body member in accordance with the position of said adapter spindle.

14. The invention of claim 13 where said spindle support means comprises clamp bushing means which at least substantially surrounds said adapter spindle for releasably clamping the same, and bushing carrier means adjustably movable on said rim clamp body member.

References Cited

UNITED STATES PATENTS

| 1,983,368 | 12/1934 | Hathorn | 287—88 XR |
| 2,562,142 | 7/1951 | Frazee | 33—203.18 |
| 2,952,435 | 9/1960 | MacMillan | 248—205 |
| 3,071,863 | 1/1963 | MacMillan | 33—203.18 |

FOREIGN PATENTS

| 909,470 | 10/1962 | Great Britain. |
| 1,024,880 | 4/1966 | Great Britain. |

ROY D. FRAZIER, *Primary Examiner.*

R. P. SEITTER, *Assistant Examiner.*